(12) United States Patent
Morreale et al.

(10) Patent No.: US 11,401,869 B2
(45) Date of Patent: Aug. 2, 2022

(54) ASSEMBLY COMPRISING A PLANETARY GEARSET

(71) Applicant: SAFRAN TRANSMISSION SYSTEMS, Colombes (FR)

(72) Inventors: Serge René Morreale, Moissy-Cramayel (FR); Fabien Roger Gaston Caty, Moissy-Cramayel (FR); Patrice Jocelyn Francis Gedin, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 365 days.

(21) Appl. No.: 16/605,076

(22) PCT Filed: Apr. 5, 2018

(86) PCT No.: PCT/FR2018/050852
§ 371 (c)(1),
(2) Date: Oct. 14, 2019

(87) PCT Pub. No.: WO2018/189457
PCT Pub. Date: Oct. 18, 2018

(65) Prior Publication Data
US 2021/0189970 A1 Jun. 24, 2021

(30) Foreign Application Priority Data
Apr. 14, 2017 (FR) ...................................... 1753298

(51) Int. Cl.
*F16H 1/28* (2006.01)
*F02C 7/36* (2006.01)
(Continued)

(52) U.S. Cl.
CPC ................ *F02C 7/36* (2013.01); *F01D 25/16* (2013.01); *F01D 25/18* (2013.01); *F16H 1/28* (2013.01);
(Continued)

(58) Field of Classification Search
CPC ............................ F01D 25/18; F16H 57/0427
See application file for complete search history.

(56) References Cited

U.S. PATENT DOCUMENTS

2013/0225353 A1\* 8/2013 Gallet ................. F16H 57/0423
475/159

FOREIGN PATENT DOCUMENTS

| FR | 3 041 054 | 3/2017 |
| WO | WO2010092263 | 8/2010 |

OTHER PUBLICATIONS

International Patent Application No. PCT/FR2018/050852, International Search Report and Written Opinion dated Jun. 29, 2018, 10 pgs. (relevance in citations and English translation of ISR).

\* cited by examiner

*Primary Examiner* — Derek D Knight
(74) *Attorney, Agent, or Firm* — Lathrop GPM LLP

(57) ABSTRACT

The invention concerns an assembly comprising an epicycloidal gear train (10) having a central pinion (26), an outer crown (28) and satellite pinions (32) in engagement with the central pinion (26) and the outer crown (28) and each mounted freely rotatable on a satellite carrier (36), the central pinion (26) surrounding and being rotationally fixed to a shaft (24) and the gear train comprising means for lubricating the teeth and axes (34) of the satellite pinions (32), these means including an annular cup (56) fixed to the satellite carrier (36) opened radially inward. According to the invention, the assembly includes fixed oil spraying (Continued)

Figure 1A:
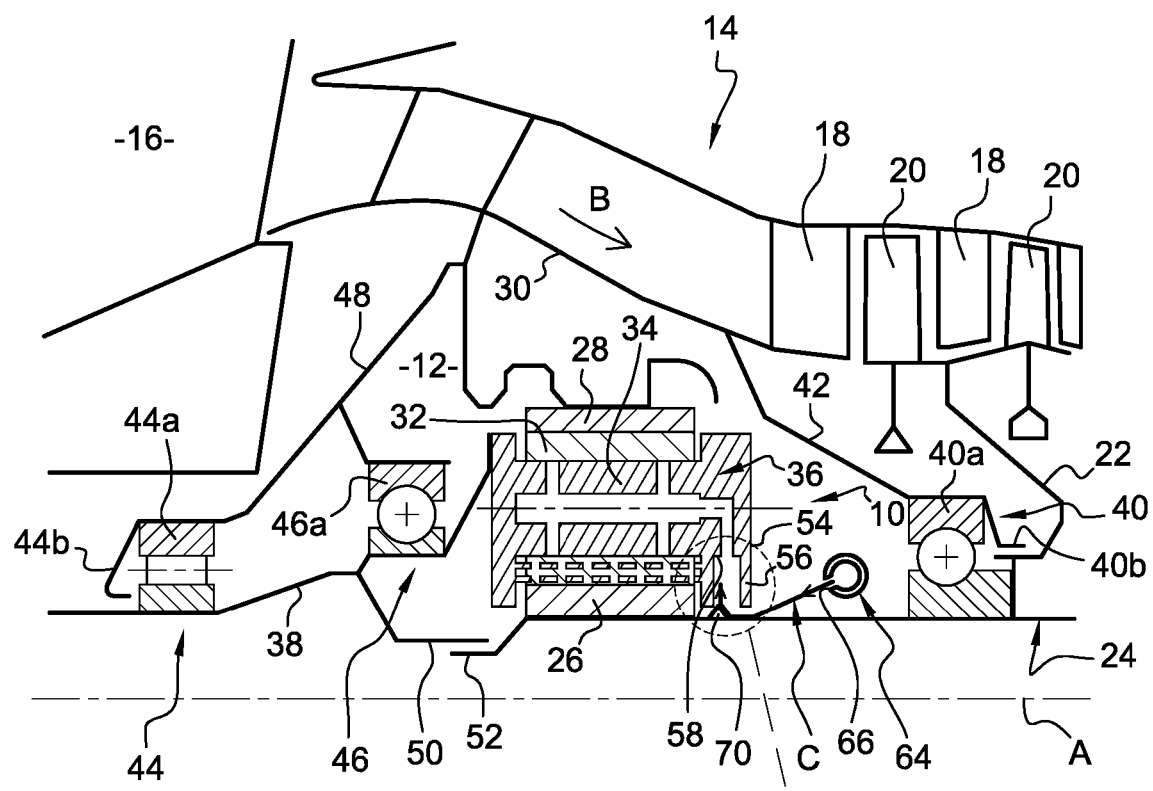

means (64) configured to spray oil towards oil deflecting means (70) towards the inside of the annular cup (56).

20 Claims, 2 Drawing Sheets

(51) Int. Cl.
*F01D 25/16* (2006.01)
*F01D 25/18* (2006.01)
*F16H 57/04* (2010.01)

(52) U.S. Cl.
CPC ....... *F16H 57/046* (2013.01); *F16H 57/0427* (2013.01); *F16H 57/0479* (2013.01); *F16H 57/0486* (2013.01); *F05D 2220/323* (2013.01); *F05D 2240/60* (2013.01)

ASSEMBLY COMPRISING A PLANETARY GEARSET

CROSS-REFERENCE TO RELATED APPLICATIONS

This application is a 35 U.S.C. § 371 filing of International Application No. PCT/FR2018/050852 filed Apr. 5, 2018, which claims the benefit of priority to French Patent Application No. 1753298, filed Apr. 14, 2017, each of which is incorporated herein by reference in its entirety.

The field of the present invention is that of turbomachinery and more particularly epicycloidal gear trains and among epicycloidal gear trains more specifically epicycloidal reducers and differential transmissions.

Typically, an epicycloidal gear unit consists of a planetary or central pinion, a planetary or outer gearwheel and satellite gearwheels that are in engagement with the planetary gearwheel and the crown, the support of one of these three components being locked in rotation for the operation of the gear train. When the carrier is fixed in rotation, the central pinion and crown are driving and driven, respectively, or vice versa. The lubrication and cooling of the gears and axes of the satellite gears is then not a problem and is ensured by nozzles that are fixed in rotation and can project oil permanently on the meshing areas of the satellite gears with the central pinion and with the crown and on the satellite gears.

However, in the most frequent case, the outer crown is fixed in rotation and the central pinion and the satellite carrier are driving and driven, respectively. This type of installation is preferred in cases where a reduction ratio of more than three is desired since it is less cumbersome. Lubrication of the meshing zones and satellite pinion axes is then a problem that is solved in current technology by complex networks of pressurized oil routing pipes, using dynamic seals or rotating joints that are subject to wear and which must be checked and replaced regularly.

Thus, the applicant proposed in a first configuration described in his application WO2010092263 a lubrication device in which a fixed injector sprays oil into an annular cup fixed to a satellite carrier, the oil being therefore recovered by centrifugation and then directed to means for lubricating the pinions. This device avoids the use of dynamic or rotating seals, which improves the reliability of the gearbox lubrication system and its maintenance.

In a second known configuration, the nozzle can be carried by the shaft carrying the central pinion so that its oil jet is directed towards the cup.

However, in either of the two configurations mentioned above, it is necessary to have sufficient space to be able to arrange the fixed nozzle or the nozzle carried by the shaft so that it can project the oil directly towards the cup. However, in small diameter turbomachines, the radial space between the radially inner periphery of the cup and the shaft is too small to consider mounting in either configuration.

The purpose of the invention is in particular to provide a simple, effective and economical solution to the problems of the prior art described above.

To this end, it offers an assembly comprising an epicycloidal gear train having a central pinion, an outer crown and satellite pinions in engagement with the central pinion and the outer crown and each mounted freely rotatable on a satellite carrier, the central pinion surrounding and being rotationally fixed to a shaft and the gear train comprising means for lubricating the teeth and axes of the satellite pinions, these means comprising an annular cup fixedly attached to the satellite holder and open radially inwardly, characterized in that it comprises fixed oil projection means configured to project oil in the direction of oil deflection means towards the inside of the annular cup.

According to the invention, the oil is no longer projected directly towards the cup but towards deflection means capable of deflecting the oil towards the cup. When the shaft is an input shaft such as a turbine shaft, its speed is higher than that of the satellite carrier that forms an output of the gear train. The projection of oil towards the deflection means allows an initial centrifugation of the oil on the shaft, which increases its pressure compared to the previous technique. This results in better oil circulation in the satellite carrier.

The deflection means are advantageously fixed to the shaft to which the central pinion is fixed. According to an embodiment, they can be formed on the shaft.

The deflection means may, for example, include an annular wall that projects radially outwards on the shaft. This wall can, for example, have an oil impact face that is concavely inclined so as to limit parasitic oil projections.

The invention is applicable, for example, to a gear train, such as a gear train in which the outer crown is fixed. In this case, the gear train can be qualified as a reducer since the output speed, i. e. that of the satellite carrier, is lower than the input speed, i. e. that of the rotating drive shaft of the central pinion. The invention also relates to a differential transmission gear train, in which the satellite carrier and the outer crown are movable in rotation in opposite directions, the satellite carrier preferably driving a first upstream fan wheel and the outer crown preferably driving a second downstream fan wheel. With such an arrangement, a double counter rotating fan wheel assembly is obtained.

The annular wall is positioned substantially axially along the shaft so that a radial plane passing through the cup intercepts the deflection wall. It can be formed by a simple annular rib with a V-shaped section whose top points radially outwards.

The cup may comprise an upstream radial annular wall and a downstream radial annular wall, one of which is axially interposed between the oil spraying means and the oil deflection means, which comprise at least one nozzle capable of spraying oil onto the shaft, in an area axially arranged between the deflection means and said annular wall axially interposed between the oil spraying means and the oil deflection means.

In this way, the oil first impacts the shaft and is then oriented by the deflection means towards the cup.

The oil spraying means may also include at least one nozzle whose oil jet includes a tangential component oriented in the direction of rotation of the shaft. Thus, the oil coming out of such a nozzle impacts the shaft with a non-zero tangential speed, which reduces oil splashes.

The invention also relates to a turbomachine comprising an assembly in which the gear train is mounted in an annular chamber formed radially inside a low-pressure compressor, the satellite carrier being connected to an upstream fan wheel and the shaft being a shaft of the low-pressure compressor. In a particular configuration, the outer crown is fixed to an annular wall defining internally an annular vein for the flow of a primary air flow, the gear train being then potentially qualified as a reducer since it allows to reduce the rotation speed of the satellite carrier in relation to the speed of the central pinion.

The gear train is preferably axially interposed between an upstream and a downstream bearing supported by a stator structure of the low-pressure compressor, the upstream bearing guiding in rotation a connecting shaft from the fan wheel to the satellite carrier and the downstream bearing guiding in rotation the low-pressure compressor shaft.

Figure 1B:
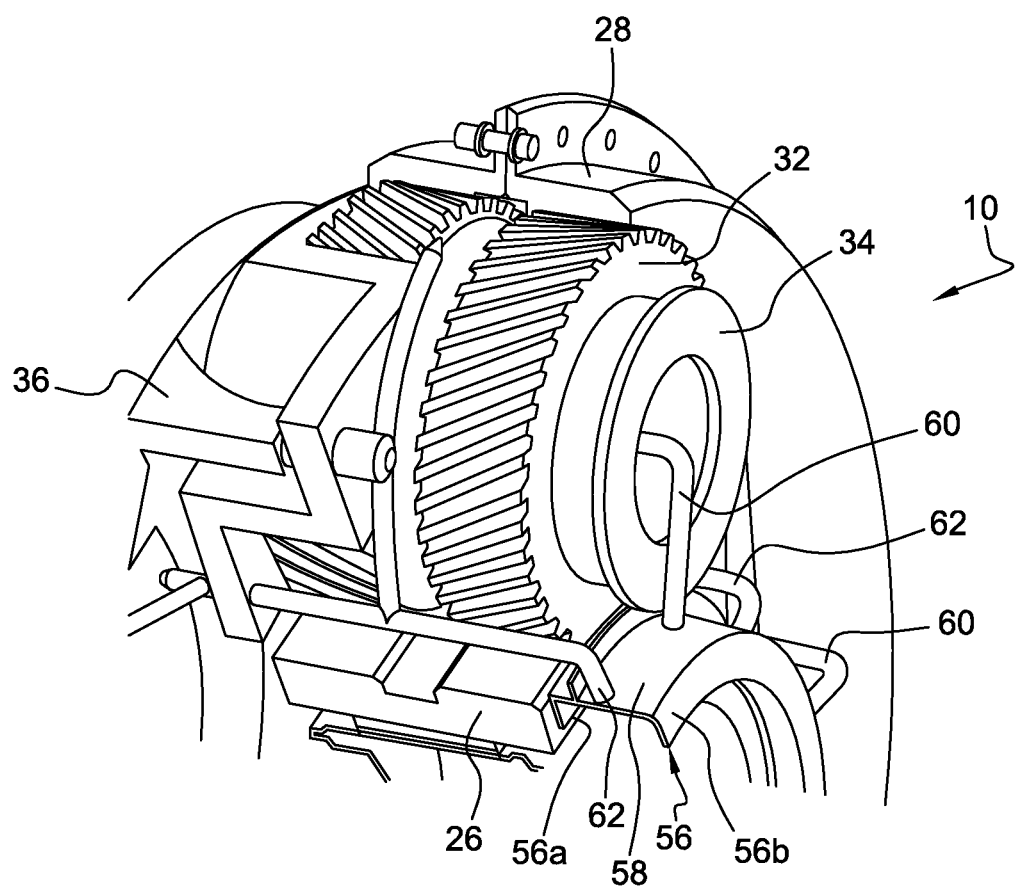

The invention will be better understood, and other details, characteristics and advantages of the invention will appear upon reading the following description given by way of a non restrictive example while referring to the appended drawings wherein:

FIG. 1A which is a schematic half-view in axial section of an epicycloidal gearbox reducer in a turbomachine according to the invention;

FIG. 1B is a schematic truncated perspective view of the gearbox reducer and of the satellite lubrication means.

First of all, we refer to FIG. 1A, which schematically represents a reducer 10, according to the invention, with epicycloidal gear trains mounted in a turbomachine such as an aircraft turbojet. Specifically, the gear train 10 is mounted in a radially formed annular chamber 12 inside a low-pressure compressor 14 arranged downstream of the fan wheel 16 and upstream of a high-pressure compressor (not shown). The low-pressure compressor 14 comprises a plurality of rows of fixed vanes 18 and annular rows of moving vanes 20 arranged axially, along axis A, alternately. The rows of moving vanes 20 are connected by an annular wall 22 to a low-pressure shaft 24, which also rotates the vanes of a downstream low-pressure turbine (not shown).

The gear train 10 reducer comprises a central pinion 26 or planetary pinion surrounding the upstream end of the shaft 24 of the low-pressure compressor and integral with it, an outer crown 28 or planetary ring gear surrounding the central pinion 26 and fixedly connected to an annular wall 30 defining internally the annular vein for the flow path of the primary air flow (arrow B) flowing in the low-pressure compressor 14. The gear unit 10 also includes satellite gears 32 which are engaged by their teeth with gears of the central pinion 26 and the outer crown 28. These satellite gears 32 are mounted freely in rotation on axes 34 of a satellite carrier 36 whose upstream end is connected by a connecting shaft 38 to the fan wheel 16.

The shaft 24 of the low-pressure compressor 14 is supported and guided in rotation by a downstream 40 ball bearing whose outer ring 40a is fixed to a first stator part 42 of the low-pressure compressor 14 connected externally to the inner annular wall 30 of the primary air vein. The connecting shaft 38 is supported and guided in rotation by two bearings 44, 46 arranged upstream of the reducer 10, a first bearing 44 of which is arranged upstream of a second bearing 46 is a roller bearing, the second bearing 46 being a ball bearing. The outer rings 44a, 46a of the first and second bearings are supported by a second stator part 48 of the low-pressure compressor connected externally to the inner annular wall 30 of the primary air vein.

The annular chamber 12 of the epicycloidal gearbox 10 reducer is thus delimited radially inwardly by the shaft 24 of the low-pressure compressor 14, radially outwardly by the first 42 and second 48 stator parts and the inner annular wall 30 of the primary air vein, upstream by the first upstream bearing 44 and downstream by the downstream bearing 40. It should be noted that the connecting shaft 38 also includes an annular wall 50 that cooperates sealingly with the upstream end 52 of the shaft 24 of the low-pressure compressor 14 to prevent lubricating oil leaks at this point. Similarly, to limit oil leaks, the outer ring 44a of the first upstream bearing 44 and the outer ring 40a of the downstream bearing 40 each have an annular portion 44b, 40b sealingly cooperating with the connecting shaft 38 and the shaft 24 of the low-pressure compressor 14, respectively.

The rotation of the satellite gears 32 in the axes 34 of the satellite carrier is carried out by means of plain bearings.

The epicycloidal gear train gearbox reducer 10 includes means for lubrication by oil spraying on the gear teeth of satellite gears 32 and their axes 34, these means essentially comprising an oil receiving impeller 54 having an annular cup 56, more particularly circular in shape. The cup 56 has a U-shaped section here, the opening of which faces radially inwards, i. e. in the direction of the axis of rotation A. The cup 56 of impeller 54 has a bottom wall 58 with holes, some of which are connected to oil supply lines 60 of the axes 34 of satellite gears 32 and others of which are connected to oil supply lines 62 of the contact areas between the teeth of satellite gears 32 and the teeth of central pinion 26 (FIG. 1B). The cup 56 also includes an upstream radial ring wall 56a and a downstream radial ring wall 56b connected by the bottom wall 58.

According to the invention, the turbomachine includes fixed oil spraying means comprising a plurality of oil nozzles 66 distributed around axis A which are connected to a pump and an oil tank. According to an embodiment of the invention, oil nozzles 66 are orifices arranged on a fixed ring 64 surrounding the low pressure shaft 24. These nozzles 66 are oriented so that their oil jets (arrow C) project oil towards deflecting means 70 of oil towards the cup 56.

The diameter of the nozzle 66 must be greater than the maximum diameter of the particles likely to block the nozzles. The diameter must also be large enough to ensure a flow of oil to the cup 56 and energetic enough to be straight over a distance of about 5 cm. In a practical embodiment of the invention, the oil spraying means are configured to have an outlet pressure of about 1 bar in the least favourable regimes such as idling. If you want to move the nozzle 66 away from the deflection means 70, you must increase the oil pressure.

The deflection means 70 include, in the example shown in FIG. 1, a V-section rib 70 with the top facing radially outwards, the rib being carried by the outer surface of the shaft 24. This rib 70 comprises an upstream ring wall 70a and a downstream ring wall 70b inclined obliquely and joining each other at an annular ridge 70c. The deflection wall is thus formed by the downstream annular wall 70b and positioned along the shaft 24 perpendicularly to the annular cup 56. More specifically, the annular rib 70 is positioned axially along the shaft 24 so that a radial plane passing through the cup 56, i. e. passing between its upstream 56a and downstream 56b walls, intercepts the deflection wall 70b. The deflection wall 70b is preferably of an axially continuous shape, i. e. without jumps. More specifically, the top 70c of rib 70, i. e. the radially outer end of the deflection wall 70b, can be positioned along the shaft 24 so as to be between 30% and 60% of the distance separating the upstream radial wall 56a from the downstream radial wall 56b, the upstream radial wall 56a being taken as a reference at 0%. Also, to facilitate oil recovery by the cup, the radially outer end of the deflection wall 70b is shaped so that the oil ejection direction passes between the upstream 56a and downstream 56b radial ring walls. For this purpose, the tangent to the deflection wall 70b at the oil ejection point passes between the upstream 56a and downstream 56b radial ring walls.

To ensure an optimal oil supply to the ring cup 56, the oil jets of the jets 66 should preferably aim at an impact point on the shaft 24 which is located axially between the two edges of the cup 56, preferably between the ring rib 70 and the downstream ring wall 56b of the ring cup 56. The direction of an oil jet from a nozzle 66 therefore includes a non-zero axial component directed from the nozzle 66 to the cup 56 and a non-zero radial component directed from the nozzle 66 to the shaft 24.

During operation, the oil jets (arrow C) of the 66 nozzles send oil to the radially outer surface of the shaft 24, the oil then flows towards the deflection wall 70b which deflects the oil to the ring cup 56, which makes it possible to supply the impeller 54 with lubricating oil despite a small radial spacing between the ring cup 56 and the shaft 24.

According to an embodiment, the direction of each of the jets of the nozzles 66 can be entirely included in a plane containing the axis of rotation A of the shaft 24. The direction of the oil jets may preferably include a non-zero tangential component directed in a direction of rotation of the shaft 24 in order to facilitate the rotational drive of the oil. The oil impacting the shaft 24 has a non-zero tangential speed, which allows to reduce the tangential speed difference between the oil and the shaft 24, thus limiting splashes.

In an alternative configuration of the invention, it is understood that the oil jets could directly impact the deflection wall 70b.

The deflection wall 70b that is impacted by the oil could have a concave curved shape in the longitudinal and/or transverse direction, optimized to allow a good redirection of the oil to the annular cup 56 while limiting parasitic oil projections.

In the assembly described above, the central pinion 26 connected to the shaft 24 of the low-pressure turbine rotates faster than the satellite carrier 36 carrying the cup 56. The oil spray on the shaft 24 allows an initial centrifugation of the oil inducing an increase in the oil pressure in the cup 56 of the satellite holder 36 compared to the oil pressure achievable if the oil was sprayed directly into the cup 56. In addition, the oil projection on the shaft 24 allows the oil to rotate in the same direction as the cup, which facilitates the flow of oil into the ring cup. It is therefore possible to have an oil feeding device in a very small radial space.

The invention claimed is:

1. An assembly comprising an epicycloidal gear train having a central pinion, an outer crown and satellite pinions in engagement with the central pinion and the outer crown and each mounted freely in rotation on a satellite carrier, the central pinion surrounding and being rotationally fixed to a shaft and the gear train comprising means for lubricating the teeth and axes of the satellite pinions, these means comprising an annular cup integral with the satellite carrier opened radially inwardly, characterized in that it comprises fixed oil projection means configured to project oil towards means for deflecting the oil towards an inside of the annular cup, wherein the deflection means are fixed to the shaft.

2. Assembly according to claim 1, characterized in that the deflection means comprise an annular wall formed radially outwardly on the shaft.

3. Assembly according to claim 2, characterized in that the annular wall is positioned axially along the shaft so that a radial plane passing through the cup intercepts the deflection wall.

4. Assembly according to claim 3, characterized in that the deflection wall is formed on a V-shaped rib whose top points radially outward.

5. Assembly according to claim 1, characterized in that the deflection means comprise an annular wall formed radially outwardly on the shaft.

6. Assembly according to claim 1, characterized in that the cup comprises an upstream radial annular wall and a downstream radial annular wall, one of which is axially interposed between the oil projection means and the oil deflection means which comprise at least one nozzle adapted to project oil onto the shaft, in an area axially arranged between the deflection means and said annular wall axially interposed between the oil projection means and the oil deflection means.

7. Assembly according to claim 1, characterized in that the cup comprises an upstream radial annular wall and a downstream radial annular wall, one of which is axially interposed between the oil projection means and the oil deflection means which comprise at least one nozzle adapted to project oil onto the shaft, in an area axially arranged between the deflection means and said annular wall axially interposed between the oil projection means and the oil deflection means.

8. Assembly according to claim 2, characterized in that the cup comprises an upstream radial annular wall and a downstream radial annular wall, one of which is axially interposed between the oil projection means and the oil deflection means which comprise at least one nozzle adapted to project oil onto the shaft, in an area axially arranged between the deflection means and said annular wall axially interposed between the oil projection means and the oil deflection means.

9. Assembly according to claim 1, characterized in that the oil projection means comprise at least one nozzle whose oil jet comprises a tangential component oriented in the direction of rotation of the shaft.

10. Assembly according to claim 1, characterized in that the oil projection means comprise at least one nozzle whose oil jet comprises a tangential component oriented in the direction of rotation of the shaft.

11. Assembly according to claim 2, characterized in that the oil projection means comprise at least one nozzle whose oil jet comprises a tangential component oriented in the direction of rotation of the shaft.

12. Assembly according to claim 6, characterized in that the oil projection means comprise at least one nozzle whose oil jet comprises a tangential component oriented in the direction of rotation of the shaft.

13. A turbomachine comprising an assembly according to claim 1 in which the gear train is mounted in an annular chamber formed radially inside a low-pressure compressor, the satellite carrier being connected to an upstream fan wheel and the shaft being a shaft of the low-pressure compressor.

14. A turbomachine comprising an assembly according to claim 1 in which the gear train is mounted in an annular chamber formed radially inside a low-pressure compressor, the satellite carrier being connected to an upstream fan wheel and the shaft being a shaft of the low-pressure compressor.

15. A turbomachine comprising an assembly according to claim 2 in which the gear train is mounted in an annular chamber formed radially inside a low-pressure compressor, the satellite carrier being connected to an upstream fan wheel and the shaft being a shaft of the low-pressure compressor.

16. A turbomachine comprising an assembly according to claim 6 in which the gear train is mounted in an annular chamber formed radially inside a low-pressure compressor, the satellite carrier being connected to an upstream fan wheel and the shaft being a shaft of the low-pressure compressor.

17. A turbomachine comprising an assembly according to claim 9 in which the gear train is mounted in an annular chamber formed radially inside a low-pressure compressor, the satellite carrier being connected to an upstream fan wheel and the shaft being a shaft of the low-pressure compressor.

18. A turbomachine comprising an assembly according to claim 1, characterized in that the gear train is axially interposed between an upstream bearing and a downstream bearing supported by a stator structure of a low-pressure compressor, the upstream bearing rotatably guiding a connecting shaft from a fan wheel to the satellite carrier and the downstream bearing rotatably guiding the shaft of the low-pressure compressor.

19. A turbomachine comprising an assembly according to claim 11, characterized in that the gear train is axially interposed between an upstream bearing and a downstream bearing supported by a stator structure of a low-pressure compressor, the upstream bearing rotatably guiding a connecting shaft from a fan wheel to the satellite carrier and the downstream bearing rotatably guiding the shaft of the low-pressure compressor.

20. A turbomachine comprising an assembly according to claim 2, characterized in that the gear train is axially interposed between an upstream bearing and a downstream bearing supported by a stator structure of a low-pressure compressor, the upstream bearing rotatably guiding a connecting shaft from a fan wheel to the satellite carrier and the downstream bearing rotatably guiding the shaft of the low-pressure compressor.

* * * * *